Oct. 4, 1927.

A. G. ANDERSON 1,644,220

LUBRICANT RECEIVING NIPPLE AND CAP THEREFOR

Filed Feb. 1, 1923

Inventor:
Andrew G. Anderson
by Emery, Booth, Janney & Varney
Attys.

Patented Oct. 4, 1927.

1,644,220

UNITED STATES PATENT OFFICE.

ANDREW G. ANDERSON, OF WOLLASTON, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICANT-RECEIVING NIPPLE AND CAP THEREFOR.

Application filed February 1, 1923. Serial No. 616,315.

This invention pertains to improvements in lubricant-receiving nipples and caps therefor. It is among the objects of the invention to provide an improved nipple for co-operation with a source of lubricant under pressure adapted to be readily coupled to and uncoupled from the nipple while providing a tight joint.

In the drawings, which show a preferred form of one embodiment of my invention:

Figure 1:
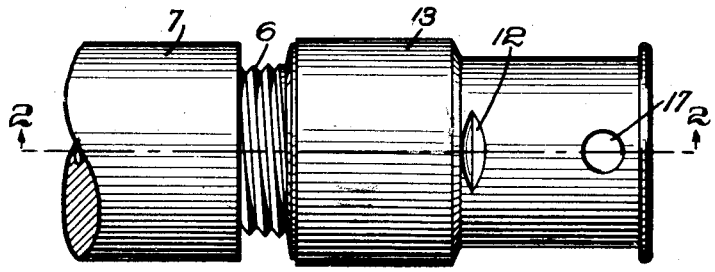
Figure 1 is a side elevation of a nipple mounted on a part to be lubricated, and protected by its dust-excluding cap.
Figure 2:
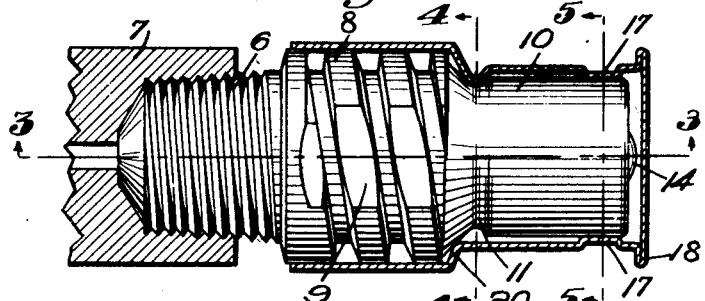
Fig. 2 is a section on the line 2—2 of Fig. 1, the nipple being shown in side elevation.
Figure 3:
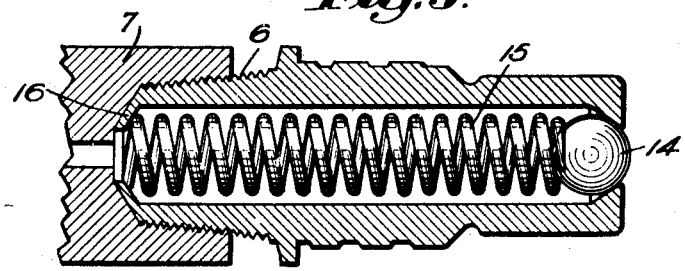
Fig. 3 is a longitudinal section through the nipple.
Figure 4:
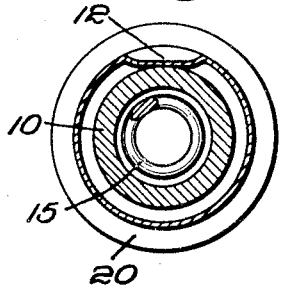
Fig. 4 is a section on the line 4—4 of Fig. 2.
Figure 5:
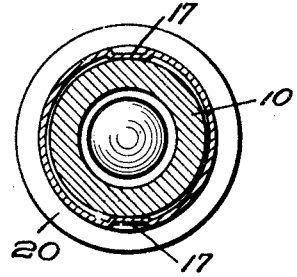
Fig. 5 is a section on the line 5—5 of Fig. 2.

Referring to the drawings and to the preferred form of my invention selected for illustrative purposes, I have shown a lubricant-receiving nipple threaded at 6 and screwed into a lubricant-receiving part 7. The nipple provides relatively steep pitch threads 8 generally substantially rectangular in cross-section and herein shown as a double thread. At opposite sides of the nipple, these threads are flattened at 9 to permit application of a wrench to screw into the part to be lubricated. Above the threaded portion of the nipple, I have shown a cylindrical portion 10 adapted to cooperate with a lubricant gun of the general type shown in the Gullborg Patent No. 1,307,734. Below the cylindrical portion 10 of the nipple and above the threaded portion 8, I have provided a recessed portion or neck 11 adapted to be engaged by a depressed portion 12 of a dust-excluding cap 13 presenting a skirt portion covering the threads 8 and a top portion covering the cylindrical portion of the nipple and the lubricant-receiving end thereof, while avoiding contact with the check ball 14 pressed to its seat by the spring 15 and held at the opposite end of the nipple by spun-in portions 16. To preclude rattling between the nipple and the cap, I may provide depressed portions 17, 17, as best shown in Figs. 2 and 5, adapted to press against the periphery of the cylindrical portion of the nipple adjacent the top thereof. The outer end of the cap may provide an extension flange 18 to facilitate gripping thereof by the fingers during removal of the cap. Contact of the top of the cap with the ball 14 may be prevented by the shoulder 20 on the cap engaging a shoulder on the nipple above the threads.

While I have shown and described a preferred embodiment of my invention, it will be understood that I have done so for purposes of clarification and not for purposes of limitation. My invention is best defined in the following claims.

1. A lubricant-receiving nipple comprising a threaded central portion of relatively large diameter and end portions of lesser diameter, said nipple having a cap-retaining groove between the central portion and the outer end portion, a cooperating pressed metal closed end cap having a continuous skirt portion surrounding said threaded portion to keep said threads free from dirt, a second skirt portion surrounding the outer end portion of the nipple and a depressed portion pressed from out of said skirt portions for engagement with the groove in the nipple to retain the cap in place upon the nipple.

2. A lubricant-receiving nipple comprising a threaded central portion of relatively large diameter and end portions of lesser diameter, said nipple having a cap-retaining groove between the central portion and the outer end portion, a cooperating one-piece pressed metal closed end cap having a continuous skirt portion surrounding said threaded portion to keep said threads free from dirt, a second skirt portion surrounding the outer end portion of the nipple and a depressed portion for engagement with the groove in the nipple to retain the cap in place upon the nipple, and anti-rattling means pressed from the second mentioned skirt portion to prevent rattle between the cap and the nipple.

3. A cap for lubricant receiving nipples comprising a closed end portion, a cylindrical skirt portion adjacent thereto, a second and larger cylindrical skirt portion constituting a continuation of said first named skirt portion, a depressed retaining portion between said skirt portions and adapted to co-operate with a depression in the nipple, and depressed portions in said first named skirt portion adapted to bear against a part of the nipple and prevent rattling.

4. A cap for lubricant receiving nipples comprising a closed end portion, a skirt portion connected therewith, a second skirt portion larger than said first mentioned skirt portion and forming a continuation thereof, a cap-retaining depression adjacent the juncture of said skirt portions, and a second depression adapted to prevent rattling of said cap on said nipple.

In testimony whereof, I have signed my name to this specification.

ANDREW G. ANDERSON.